United States Patent Office 2,980,722
Patented Apr. 18, 1961

2,980,722

CARBOXY PHOSPHATES

Gail H. Birum and James L. Dever, Dayton, Ohio, assignors to Monsanto Chemical Company, St. Louis, Mo., a corporation of Delaware No Drawing. Filed May 8, 1959, Ser. No. 811,791

6 Claims. (Cl. 260—461)

The present invention relates to organic compounds of phosphorus and more particularly provides a new and valuable class of carboxy phosphates and methods of preparing the same.

According to the invention dialkyl 1-carboalkoxyalkyl phosphates are prepared by heating a dialkyl phosphonate with an alkyl 2-oxoalkanoate substantially according to the scheme

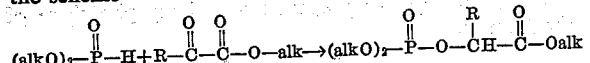

in which alk denotes an alkyl radical of from 1 to 8 carbon atoms and R is an alkyl radical of from 1 to 4 carbon atoms.

Presently useful dialkyl phosphonates are, e.g., the simple esters such as dimethyl, diethyl, diisopropyl, di-n-propyl, di-n-butyl, di-tert-butyl, diisobutyl, di-n-amyl, di-tert-amyl, di-n-hexyl, di-n-heptyl, di-n-octyl or bis(2-ethylhexyl) phosphonate and the mixed esters such as ethyl methyl, n-butyl isopropyl, 2-ethylhexyl n-propyl, ethyl n-hexyl, tert-amyl n-octyl, isobutyl methyl, or ethyl n-heptyl phosphonate.

The presently useful alkyl 2-oxoalkanoates are the alkyl esters of pyruvic, 2-oxobutyric, 2-oxovaleric or 2-oxohexanoic acid, e.g., methyl pyruvate, n-propyl pyruvate, n-butyl pyruvate, 2-ethylhexyl pyruvate, ethyl 2-oxobutyrate, isopropyl 2-oxobutyrate, n-octyl 2-oxobutyrate, methyl 2-oxovalerate, n-butyl 2-oxovalerate, n-octyl 2-oxo-valerate, ethyl 2-oxohexanoate, tert-butyl 2-oxohexanoate, 2-ethylhexyl 2-oxohexanoate, etc.

Dialkyl 1-carboalkoxyalkyl phosphates provided by the invention are, e.g., dimethyl 1-carboethoxyethyl phosphate which is prepared from dimethyl phosphonate and ethyl pyruvate, di-n-butyl 1-carbo-n-propoxybutyl phosphate which is prepared from di-n-butyl phosphonate and n-propyl 2-oxovalerate, bis(2-ethylhexyl) 1-carbo-n-butoxypropyl phosphate which is prepared from bis(2-ethylhexyl) phosphonate and n-butyl 2-oxobutyrate, and diethyl 1-carbomethoxyamyl phosphate which is prepared from diethyl phosphonate and methyl 2-oxohexanoate. Other presently provided carboxylated phosphates are, e.g., dimethyl 1-carbomethoxyethyl phosphate, diethyl 1-carbo-n-butoxyethyl phosphate, di-n-propyl 1-carbomethoxyethyl phosphate, di-n-butyl 1-carbo-n-octyloxyethyl phosphate, di-n-amyl 1-carboisopropoxyethyl phosphate, bis(2-ethylhexyl) 1-carbomethoxypropyl phosphate, di-tert-amyl 1-carbo-n-butoxypropyl phosphate, diethyl 1-carboethoxypropyl phosphate, dimethyl 1-carbo-n-propoxybutyl phosphate, diethyl 1-carboethoxybutyl phosphate, di-n-hexyl 1-carbo-n-hexyloxybutyl phosphate, diethyl 1-carboethoxyamyl phosphate, di-n-butyl 1-carbo-n-butoxyamyl phosphate, and di-n-octyl 1-carbo-n-propoxyamyl phosphate.

Preparation of the present dialkyl 1-carboalkoxyalkyl phosphates is effected by heating the dialkyl phosphonate with the alkyl-2-oxoalkanoate at a temperature of over 100° C. and less than 200° C. Since the reaction proceeds by addition of one mole of said phosphonate with one mole of said 2-oxoalkanoate, these reactants are advantageously employed in such stoichiometric proportion. However, since either the unreacted oxo-ester or the unreacted phosphorus ester may readily be recovered from the final reaction product, an excess of either the oxo-ester or of the dibasic phosphonate may be used. Such an excess may conveniently serve as diluent; however, no diluent need be employed. The reaction may also be effected in the presence of extraneous diluents or solvents. As will be appreciated by those skilled in the art, such diluents or solvents should have a boiling point which will permit operation at a temperature of over 100° C. Examples of presently useful liquids are, e.g., xylene, toluene, tetralin, etc. Use of higher temperatures, i.e., temperatures of, say, 130° C. generally serves to reduce the reaction time; hence, when a diluent is used it should advantageously have a boiling point and be employed in such a quantity that operation within 130° C. to 190° C. is permitted. Progress of the reaction is readily followed by noting cessation in change of viscosity, refractive index, etc. When no diluent is used and the reactants are present in the equimolar proportion, the product is the substantially pure dialkyl 1-carboalkoxyalkyl phosphate. When the reaction has been conducted in the presence of an inert solvent and/or an excess of one of the reactants, distillation of the reaction mixture is generally employed to give the substantially pure carboxy phosphate. For many purposes, however, a crude reaction mixture comprising said phosphate in the reaction diluent may be used directly, e.g., as gasoline additive or biological toxicant.

The present dialkyl 1-carboalkoxyalkyl phosphates are also obtainable by contacting a dialkyl phosphorohalidate with an alkyl 2-hydroxyalkanoate substantially according to the scheme

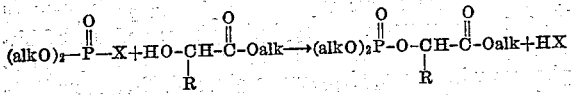

in which alk denotes an alkyl radical of from 1 to 8 carbon atoms, R is an alkyl radical of from 1 to 4 carbon atoms and X is halogen. Examples of presently useful phosphorohalidates are dimethyl, diethyl, dipropyl, dibutyl, diamyl, dihexyl, bis(2-ethylhexyl), di-n-octyl, ethyl methyl, amyl butyl or hexyl propyl phosphorochloridate, phosphoroiodate or phosphorobromidate. The useful alkyl 2-hydroxyalkanoates are the alkyl lactates, the alkyl 2-hydroxybutyrates, the alkyl 2-hydroxyvalerates and the alkyl 2-hydroxyhexanoates wherein the alkyl radical has from 1 to 8 carbon atoms, e.g., methyl, ethyl, propyl, isopropyl, butyl, amyl, hexyl, heptyl, 2-ethylhexyl or n-octyl lactate, 2-hydroxybutyrate, 2-hydroxyvalerate or 2-hydroxyhexanoate.

Reaction of the dialkyl phosphorohalidate with the hydroxyalkanoate may be conducted at ordinary or increased temperature in the presence of a basic agent. It is advantageously effected by heating the two reactants at a temperature of from, say, 50° C. to 150° C. in the presence of basic agent. The latter serves as scavenger for the hydrogen halide which is evolved as by-product. Useful basic agents are, e.g., the alkali metal carbonates, the heterocyclic nitrogen bases, tertiary amines. Extraneous, inert diluents or solvents, e.g., ether, benzene, or xylene, may or may not be employed. Isolation of the dialkyl 1-carboalkoxyalkyl phosphate from the crude reaction mixture is readily effected by customary isolating procedures, e.g., by distillation, solvent extraction, etc.

The presently provided carboxy phosphates are stable, well characterized compounds which are advantageously employed for a variety of commercial and agricultural purposes. They may be used as biological toxicants, e.g., as insecticides, fungicides, nematocides and bacteriostats; as hydrocarbon oil lubricants and as gasoline additives; as functional fluids, e.g., in force-transmission and dielectric applications; as plasticizers for synthetic resins and plastics, particularly polyvinyl chloride; and as flame-proofing agents for cellulosic and carbonaceous combustible materials in general, e.g., textile fibers, surface coatings, lacquers, polymers, resins and adhesives. The presently provided carboxy phosphates are especially of interest for use as preignition additives to leaded fuels. Improved fuels for spark ignition internal combustion engines are obtained by adding the carboxy phosphate to gasoline containing an organo lead antiknock, e.g., tetraethyllead. The quantity of said phosphate thus employed will vary from, say, 0.05 to 10.0 moles of the carboxy phosphate per atom of lead present in the fuel.

The present invention is illustrated by, but not limited to, the following examples:

Example 1

Ethyl pyruvate, 58.1 g. (0.5 mole) and 69.1 g. (0.5 mole) of diethyl phosphonate were charged into a flask equipped with a stirrer, thermometer, and condenser. This solution was heated at 155–190° C. for three hours. Distillation gave a small amount of forerun and 90.4 g. (71% yield) of 1-carboethoxyethyl diethyl phosphate, B.P. 86° C. (0.05 mm.), $n_D^{25}$ 1.4180, and analyzing as follows:

|  | Found | Calcd. for $C_9H_{19}O_4P$ |
| --- | --- | --- |
| Percent C | 42.68 | 42.58 |
| Percent H | 7.29 | 7.53 |
| Percent P | 11.90 | 12.18 |

Substitution of methyl 2-oxobutyrate for the ethyl pyruvate in the above experiment gives a good yield of diethyl 1-carbomethoxypropyl phosphate; and use of bis-(2-ethylhexyl) phosphonate instead of the diethyl phosphonate with n-propyl pyruvate gives bis(2-etylhexyl) 1-carbo-n-propoxyethyl phosphate.

Example 2

This example shows the preparation of the presently provided 1-carboethoxy diethyl phosphates from ethyl lactate and diethyl phosphorochloridate.

Ethyl lactate, 34.0 g. (0.33 mole), and 52.2 g. (0.33 mole) of diethyl phosphorochloridate, together with 27 g. (0.33 mole) of pyridine in 200 ml. of anhydrous diethyl ether, were charged into a flask equipped with a stirrer, thermometer, and condenser. This mixture was then heated at reflux for nine hours. After filtration and removal of the solvent, distillation gave a small amount of forerun and 34.4 g. (47% yield) of 1-carboethoxyethyl diethyl phosphate, B.P. 86° C./0.05 mm., $n_D^{25}$ 1.4178, and analyzing as follows:

|  | Found | Calcd. for $C_9H_{19}O_4P$ |
| --- | --- | --- |
| Percent C | 42.36 | 42.58 |
| Percent H | 7.52 | 7.53 |
| Percent P | 12.07 | 12.18 |

Similar reaction of di-n-butyl phosphorobromidate with methyl 2-hydroxybutyrate gives di-n-butyl 1-carbomethoxypropyl phosphate.

What we claim is:

1. A carboxy phosphate of the formula

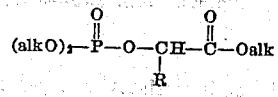

in which alk denotes an alkyl radical of from 1 to 8 carbon atoms and R is an alkyl radical of from 1 to 4 carbon atoms.

2. A dialkyl 1-carboalkoxyethyl phosphate having from 1 to 8 carbon atoms in each alkyl radical and in the alkoxy radical.

3. 1-carboxyethoxyethyl diethyl phosphate.

4. The method of preparing a carboxy phosphate of the formula

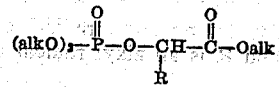

wherein alk denotes an alkyl radical of 1 to 8 carbon atoms and R is an alkyl radical of 1 to 4 carbon atoms which comprises heating, at a temperature of over 100° C. and below 200° C., a dialkyl phosphonate having from 1 to 8 carbon atoms in each alkyl radical with an alkyl 2-oxoalkanoate of the formula

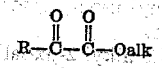

wherein R and alk are as herein defined.

5. The method of preparing a dialkyl 1-carboalkoxyethyl phosphate having from 1 to 8 carbon atoms in each alkyl radical and 1 to 8 carbon atoms in the alkoxy radical which comprises heating at a temperature of over 100° C. and below 200° C., a dialkyl phosphonate having from 1 to 8 carbon atoms in each alkyl radical, with an alkyl pyruvate having from 1 to 8 carbon atoms in the alkyl radical.

6. The method of preparing diethyl 1-carboethoxyethyl phosphate which compares heating diethyl phosphonate with ethyl pyruvate at a temperature of over 100° C. and below 200° C.

References Cited in the file of this patent

Kosolapoff: Organo Phosphorus Compounds (1950), John Wiley & Sons, New York, N.Y., pages 123–124. (Copy in P.O. Scientific Library.)